US010102684B2

(12) United States Patent
Iehara et al.

(10) Patent No.: US 10,102,684 B2
(45) Date of Patent: Oct. 16, 2018

(54) ON-BOARD DEVICE AND ROUTE INTERPOLATING METHOD THEREFOR

(71) Applicant: MITSUBISHI HEAVY INDUSTRIES MECHATRONICS SYSTEMS, LTD., Hyogo (JP)

(72) Inventors: Masato Iehara, Tokyo (JP); Ryota Hiura, Tokyo (JP); Yoshihiro Mabuchi, Tokyo (JP)

(73) Assignee: MITSUBISHI HEAVY INDUSTRIES MACHINERY SYSTEMS, LTD., Kobe-Shi, Hyogo ( * ) Notice: Subject to any disclaimer, the term of this patent is extended or adjusted under 35 U.S.C. 154(b) by 112 days.

(21) Appl. No.: 15/120,123

(22) PCT Filed: Feb. 21, 2014

(86) PCT No.: PCT/JP2014/054225
§ 371 (c)(1),
(2) Date: Aug. 19, 2016

(87) PCT Pub. No.: WO2015/125284
PCT Pub. Date: Aug. 27, 2015

(65) Prior Publication Data
US 2017/0061706 A1    Mar. 2, 2017

(51) Int. Cl.
G01C 21/00    (2006.01)
G01C 21/30    (2006.01)
G07B 15/06    (2011.01)

(52) U.S. Cl.
CPC ............. G07B 15/06 (2013.01); G01C 21/30 (2013.01)

(58) Field of Classification Search
CPC .................. G01C 21/30; G07B 15/06
See application file for complete search history.

(56) References Cited

U.S. PATENT DOCUMENTS 7,920,872 B2 *  4/2011  Hessling ............... G01C 21/26
                                                340/995.1
2008/0125963 A1   5/2008  Shimizu
(Continued)

FOREIGN PATENT DOCUMENTS

JP    2003-194562 A    7/2003
JP    2005-340975 A    12/2005
(Continued)

OTHER PUBLICATIONS

International Search Report in International Application No. PCT/JP2014/054225, dated May 27, 2014.
(Continued)

Primary Examiner — Thomas G Black
Assistant Examiner — Demetra R Smith-Stewart
(74) Attorney, Agent, or Firm — Kanesaka Berner and Partners LLP

(57) ABSTRACT

An object of the present invention is to interpolate a discontinuous zone by use of an appropriate interpolated route in terms of fee-charging. An on-board device includes a map information storage unit storing map information in which a road is divided into a plurality of line segments in a pseudo manner and each of the divided line segments is made to correspond to unique identification information and the positional information, and an interpolated route information storage unit storing interpolated route information in which a combination of two discontinuous line segments and a line segment constituting an interpolated route for connecting the former line segments are uniquely defined, in which a moving route creation unit uses the interpolated route information to interpolate the discontinuous zone in a case where two line segments consecutively specified by a link specifying unit are discontinuous on the map information.

6 Claims, 8 Drawing Sheets

(56) References Cited

U.S. PATENT DOCUMENTS

| | | | |
|---|---|---|---|
| 2009/0005980 A1 | 1/2009 | Nakao et al. | |
| 2011/0032357 A1* | 2/2011 | Kitaura | B60R 1/00 |
| | | | 348/148 |
| 2014/0172153 A1* | 6/2014 | Nishibashi | G05B 19/4103 |
| | | | 700/192 |
| 2015/0105108 A1* | 4/2015 | Lee | H04W 4/02 |
| | | | 455/457 |

FOREIGN PATENT DOCUMENTS

| | | |
|---|---|---|
| JP | 2007-139748 A | 6/2007 |
| JP | 2007-333652 A | 12/2007 |
| JP | 2008-134086 A | 6/2008 |
| JP | 2009-8590 A | 1/2009 |
| JP | 2009-150907 A | 7/2009 |
| JP | 2009-294479 A | 12/2009 |
| JP | 2011-75345 A | 4/2011 |
| JP | 2011-76279 A | 4/2011 |
| JP | 2011-164453 A | 8/2011 |
| JP | 2012-108748 A | 6/2012 |
| JP | 2012-141800 A | 7/2012 |
| JP | 2012-233791 A | 11/2012 |

OTHER PUBLICATIONS

Written Opinion of the ISA in International Application No. PCT/JP2014/054225, dated May 27, 2014.
Office Action in JP Application No. 2013-7776, dated Oct. 4, 2016.

* cited by examiner

FIG. 3

| JUMP SOURCE Link ID | JUMP DESTI-NATION Link ID | INTERPOLATED ROUTE |
|---|---|---|
| 44885 | 31847 | 44885 → 43492 → 31847 |
| 44885 | 43487 | 44885 → 43492 → 31847 → 43487 |
| 44885 | 48288 | 44885 → 43492 → 31847 → 43487 → 48288 |
| 44885 | 43215 | 44885 → 43492 → 31847 → 43215 |
| 44885 | 43489 | 44885 → 43492 → 31847 → 43215 → 43489 |
| 44885 | 45213 | 44885 → 43492 → 31847 → 43215 → 43489 → 45213 |
| 43492 | 43487 | 43492 → 31847 → 43487 |
| 43492 | 48288 | 43492 → 31847 → 43487 → 48288 |
| 43492 | 43215 | 43492 → 31847 → 43215 |
| 43492 | 43489 | 43492 → 31847 → 43215 → 43489 |
| 43492 | 45213 | 43492 → 31847 → 43215 → 43489 → 45213 |
| 31847 | 43489 | 31847 → 43215 → 43489 |
| 31847 | 45213 | 31847 → 43215 → 43489 → 45213 |

FIG. 5

| JUMP SOURCE Link ID | JUMP DESTINATION Link ID | INTERPOLATED ROUTE |
|---|---|---|
| 3052 | 3013 | 3052→3051→3011→3012→3013 |

FIG. 6

| CLOCK TIME | Link ID | JUMP FLAG |
|---|---|---|
| t | Lnow | 1 |

FIG. 8

MOVING ROUTE INFORMATION

| CLOCK TIME | Link ID | JUMP FLAG |
|---|---|---|
| t1 | L1 | 0 |
| t2 | L2 | 0 |
| ... | ... | ... |
| tn-1 | Ln-1 | 1 |
| tn | Ln | 0 |

FIG. 9

| JUMP SOURCE Link ID | JUMP DESTINATION Link ID | INTERPOLATED ROUTE |
|---|---|---|
| 3052 | 3013 | 3052→3051→3011→3012→3013<br>CANCEL FEE-CHARGING |

ON-BOARD DEVICE AND ROUTE INTERPOLATING METHOD THEREFOR

RELATED APPLICATIONS

The present application is a National Phase of International Application Number PCT/JP2014/054225, filed Feb. 21, 2014, the disclosure of which is hereby incorporated by reference herein in its entirety.

TECHNICAL FIELD

The present invention relates to an on-board device and a route interpolating method therefor.

BACKGROUND ART

Conventionally, a technology called map matching, which uses positional information acquired by use of a GPS or the like and map information provided in advance to specify a moving route has been known as one of functions of a car navigation system or the like.

In addition, for example, a fee-charging system known as road pricing in which a collection fee determined depending on a distance travelled in a fee-charging area is charged in a case of entering the fee-charging area and thereafter going out of the fee-charging area, and a fee-charging system in which a collection fee determined depending on a distance travelled on a fee-charging road is charged or an across-the-board road usage fee is charged in a case of entering the fee-charging road and thereafter going out of the fee-charging road, have been known.

In such a road pricing, the map matching described above is used to estimate a position on a map, for example, and this estimated position crossing a border between the fee-charging area registered in advance and the outside of the fee-charging area causes determination of entering the fee-charging area and going out of the fee-charging area.

However, for example, in a case where the border of the fee-charging area is set at a part of a complex intersection as shown in FIG. 10, a problem as follows is brought about.

That is, since the map matching is performed at regular intervals, even if a vehicle actually has moved on a moving route illustrated in FIG. 10 by a broken line, in a case where a position previously detected is a point A in the figure and a position detected next time is a point B in the figure, the moving route recognized instantaneously is to be a route illustrated by a solid line in the figure. In this case, it may be probable that erroneous recognition is made that a border D of the fee-charging area is not crossed.

Even in the case where the erroneous moving route is specified in this way, the on-board device, which has a function to correct the moving route by tracing back to its past, may correct this moving route ex post facto to recognize that the border of the fee-charging area was crossed.

However, in recent years, it has been demanded that a driver is instantaneously notified of an event of starting the road pricing or fixing the collection fee. In order to respond to such a demand, the erroneous moving route owing to the map matching described above needs to be corrected earlier.

There has been disclosed the following technology in Patent Citation 1 as a technology for improving an accuracy of the map matching described above, for example.

One or more candidate links are extracted with respect to a mobile object positional information by means of map data with positional information defined in units of links and the mobile object positional information to take one link as being definite from the extracted one or more candidate links. In a case where the moving route formed of the decided links is discontinuous, candidate links for interpolating a discontinuous zone are searched for to decide one link to be employed from the searched candidate links and the discontinuous zone is interpolated by use of the decided link.

Patent Citation 1: Japanese Unexamined Patent Application, Publication No. 2011-76279

SUMMARY OF INVENTION

Technical Problem

However, in Patent Citation 1 described above, the moving route is specified according to a certain algorithm. Therefore, for example, the specified moving route may not necessarily match an actual moving route. Moreover, in the case where the moving route is erroneously specified, if a fee-charging position is set for the erroneously specified moving route, a fee may be charged in spite of not entering the fee-charging area, which probably makes a driver feel uncomfortable.

An object of the present invention is to interpolate a discontinuous zone by use of an interpolated route appropriate in terms of fee-charging.

Solution to Problem

A first aspect of the present invention is an on-board device including a positional information acquisition means acquiring positional information of a mobile object, a map information storage means storing map information in which a road is divided into a plurality of line segments in a pseudo manner and each of the divided line segments is made to correspond to unique identification information and the positional information, a line segment specifying means specifying a line segment on the map information corresponding to current positional information of the mobile object, an interpolated route information storage means storing interpolated route information in which (i) a combination of two discontinuous line segments and (ii) a line segment constituting an interpolated route for connecting the former line segments are uniquely defined, and a route interpolation means using the interpolated route information to interpolate a discontinuous zone in a case where two line segments consecutively specified by the line segment specifying means are discontinuous on the map information.

According to the above aspect, if the line segments specified by the line segment specifying means are discontinuous, the interpolated route information stored in the interpolated route information storage means is used to interpolate the discontinuous zone. Therefore, the discontinuous zone can be interpolated with the interpolated route suitable for the fee-charging by storing in advance the interpolated route suitable for the fee-charging as the interpolated route information.

The above on-board device may further include a fee-charging information storage means storing notified line segment information in which the identification information of a line segment which is required to be notified relating to fee-charging is registered, a determination means determining whether or not the line segments specified by the line segment specifying means and the line segment constituting the interpolated route interpolated by the route interpolation means are registered in the notified line segment information in the fee-charging information storage means, and a notification means notifying information concerning the fee-charging in a case where the determination means determines the registration.

According to the above configuration, registered in advance is the identification information of the line segment which requires to be notified relating to the fee-charging, allowing the information concerning the fee-charging to be rapidly notified in a case where a vehicle passes through a road corresponding to this line segment.

In the above on-board device, the interpolated route information may be preferably updated at a predetermined time interval.

In this way, the interpolated route information is updated, allowing the interpolation using the interpolated route information depending on a road condition at the corresponding time.

In the above on-board device, it may be such that the interpolated route information is prepared depending on at least one of a time zone and a type of vehicles, and the route interpolation means uses a interpolated route information satisfying a condition to interpolate the discontinuous line segments.

In this way, the interpolated route information is prepared depending on the time zone or the type of vehicles, allowing to deal with, for example, the case of a road closed to traffic depending on the time zone or a road which a vehicle is prohibited from passing through depending on the type of the vehicle.

In the above on-board device, in the interpolated route information, fee-charging cancel information may be made addible as attribute information to the line segment constituting the interpolated route.

In this way, the fee-charging cancel information is made addible to the line segment constituting the interpolated route, avoiding the fee-charging.

A second aspect of the present invention is a route interpolating method for an on-board device in which map information in which a road is divided into a plurality of line segments in a pseudo manner and each of the divided line segments is made to correspond to unique identification information and the positional information, and interpolated route information in which a combination of two discontinuous line segments and line segments constituting an interpolated route for connecting the former line segments are uniquely defined are prepared in advance, the method including a positional information acquisition step of acquiring positional information of a mobile object, a line segment specifying step of specifying a line segment on the map information corresponding to current positional information of the mobile object, and a route interpolation step of using the interpolated route information to interpolate a discontinuous zone in a case where two line segments consecutively specified in the line segment specifying step are discontinuous on the map information.

A third aspect of the present invention is a route interpolating program for an on-board device in which map information in which a road is divided into a plurality of line segments in a pseudo manner and each of the divided line segments is made to correspond to unique identification information and the positional information, and interpolated route information in which a combination of two discontinuous line segments and line segments constituting an interpolated route for connecting the former line segments are uniquely defined are stored in a storage means in advance, the program causing a computer to execute a positional information acquisition process of acquiring positional information of a mobile object, a line segment specifying process of specifying a line segment on the map information corresponding to current positional information of the mobile object, and a route interpolation process of using the interpolated route information to interpolate a discontinuous zone in a case where two line segments consecutively specified in the line segment specifying process are discontinuous on the map information.

Advantageous Effects of Invention

According to the present invention, an effect can be obtained such that a discontinuous zone is interpolated by use of an interpolated route appropriate in terms of fee-charging.

DESCRIPTION OF EMBODIMENTS

FIG. 3 is a diagram illustrating an example of interpolated route information.

FIG. 5 is a diagram illustrating the interpolated route information which is created assuming the case of U-turn shown in FIG. 4.

FIG. 6 is a diagram illustrating an example of link information.

FIG. 8 is a diagram illustrating an example of moving route information created on the basis of the link information.

FIG. 9 is a diagram illustrating an example of the interpolated route information to which cancel information is added.

DESCRIPTION OF EMBODIMENTS

Hereinafter, a description is given of an embodiment of an on-board device and a route interpolating method therefor according to the present invention with reference to the drawings.

An on-board device according to the embodiment, which is widely used for a road pricing, is applied to, for example, a fee-charging system in which an across-the-board fee may be charged in passing through a fee-charging road, and a fee-charging system in which a fee may be charged depending on a travel distance in a predetermined fee-charging area. In addition, the on-board device may be applied to either of a case where a collection fee is fixed or charged in entering a fee-charging area or fee-charging road, or a case where the collection fee is fixed or charged in going out of the fee-charging area or fee-charging road.

Figure 1:
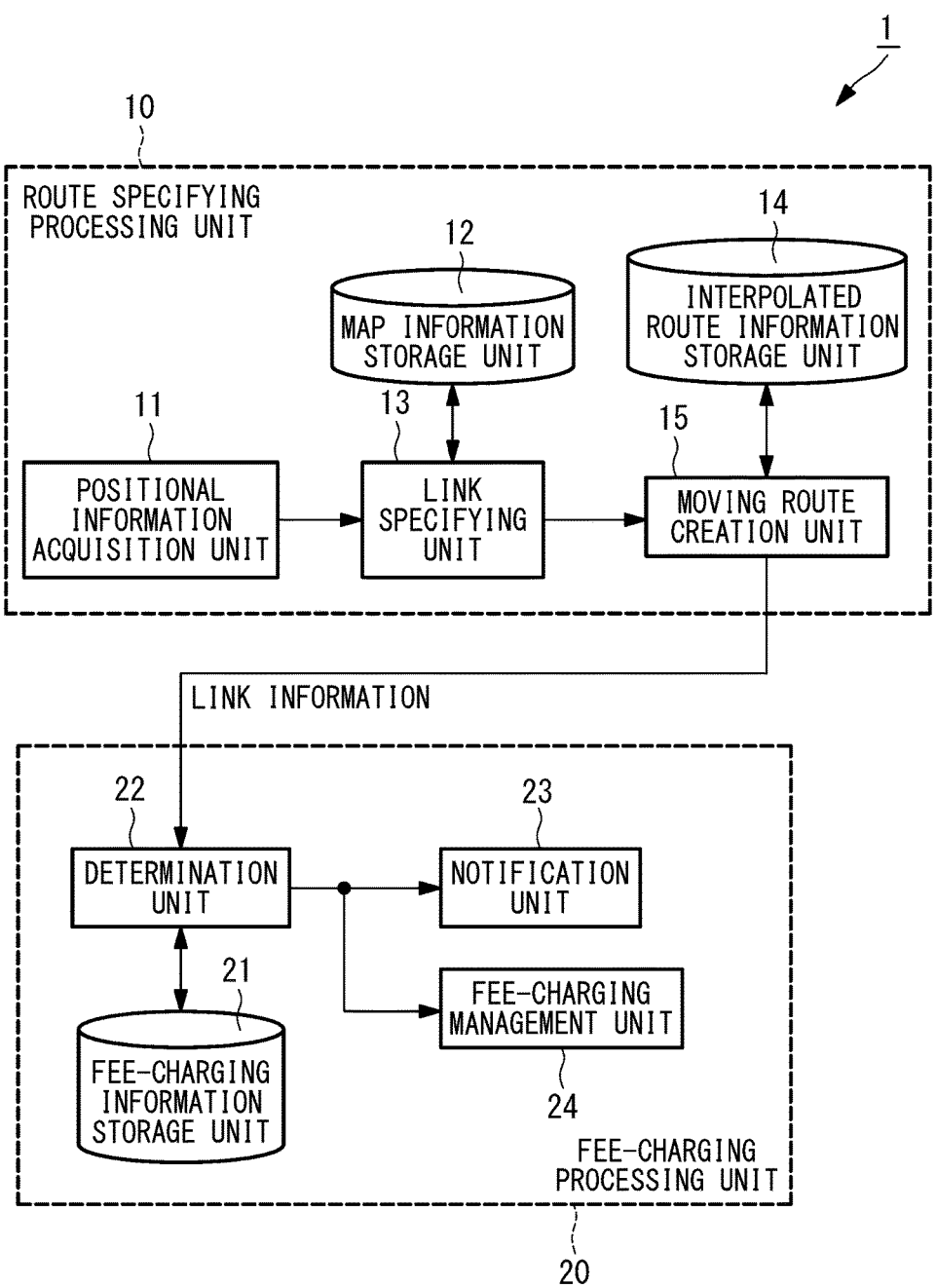
FIG. 1 is a functional block diagram of an on-board device according to an embodiment of the present invention.

FIG. 1 is a view showing a functional block diagram of an on-board device 1 according to an embodiment of the present invention. The on-board device 1 has a computer mounted thereon, for example, in which a function of each unit shown below is achieved by hardware corresponding to the function or achieved by an arithmetic processing device executing a program stored in a computer-readable storage medium (route interpolating program).

As shown in FIG. 1, the on-board device 1 includes a Route specifying processing unit 10 performing a process of specifying a moving route, and a fee-charging processing unit 20 performing a process concerning fee-charging.

First, a description is given of the Route specifying processing unit 10, and then, of the fee-charging processing unit 20.

The Route specifying processing unit 10 includes a positional information acquisition unit (positional information acquisition means) 11, a map information storage unit (map information storage means) 12, a link specifying unit (line segment specifying means) 13, an interpolated route information storage unit (interpolated route information storage means) 14, and a moving route creation unit 15.

The positional information acquisition unit 11, which is a GPS or the like, for example, acquires positional information of a mobile object. In a location where the GPS cannot be used (e.g., in a tunnel), a gyro, an acceleration sensor and the like may be used to detect a position.

Figure 2:
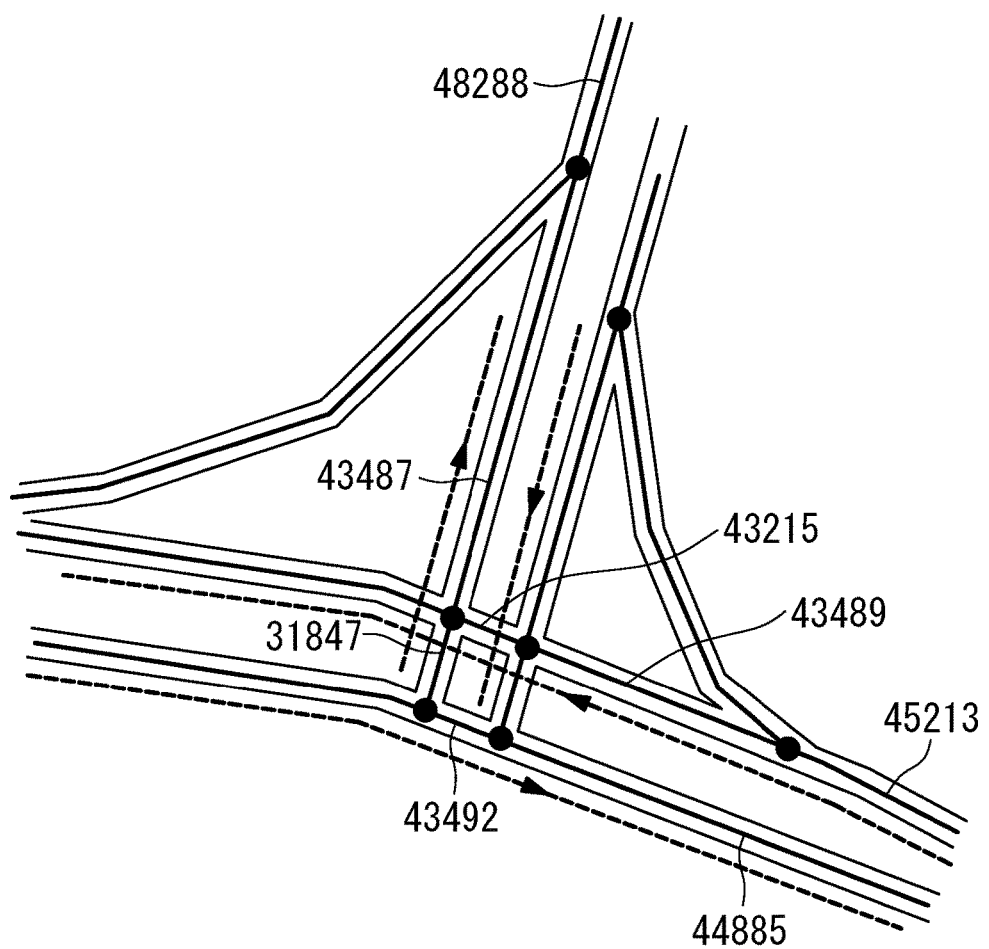
FIG. 2 is an illustration for explaining map information according to an embodiment of the present invention.

The map information storage unit 12 stores map information in which a road is divided into a plurality of line segments (hereinafter, referred to as a "link") in a pseudo manner and the divided link is made to correspond to unique identification information (link ID) and the positional information (e.g., latitude and longitude). This map information is described with reference to FIG. 2. The map information is obtained by editing an actual map to facilitate specifying the moving route. For example, in the map information, one lane and an opposite lane of a two-way traffic road are illustrated as different roads as shown by a broken line arrow in the figure. Nodes are set at intersections and turnoffs on the road (see black circles in the figure) where basically a line segment between the nodes is defined as a link. The link set in this way may be further divided into finer portions such that a plurality of nodes are configured between the nodes.

Each link is made to correspond to the link ID (see numeral 44885, 43492, 31847 or the like in FIG. 2, for example) and the positional information.

The link specifying unit 13 specifies the link corresponding to the positional information acquired by the positional information acquisition unit 11 by use of the map information stored in the map information storage unit 12. The link specifying unit 13 determines whether or not the link having the link ID previously specified and the link having the link ID specified this time are discontinuous on the map information. Then, the unit 13 creates link information in which a result of the determination, the link ID specified this time, and an clock time when acquiring the positional information are associated with each other, and outputs this link information to the moving route creation unit 15.

FIG. 6 shows an example of the link information. In the link information shown in FIG. 6, a jump flag, which is a flag indicating whether or not the link specified this time is discontinuous with the previous link, indicates that the links are continuous in a case of 0 and that the links are discontinuous in a case of 1.

The interpolated route information storage unit 14 stores therein the interpolated route information 30. The interpolated route information 30 is information in which, as shown in FIG. 3, a combination of links which are not connecting with each other, that is, are discontinuous, and one or more links constituting an interpolated route for connecting the former links are uniquely defined. A combination of two discontinuous links is defined by a jump source link and a jump destination link, for example. For example, the interpolated route information 30 specified by a jump source link ID of 44885 and a jump destination link ID of 43487 has the interpolated route in which the link IDs 44885, 43492, 31847, and 43487 are set.

Then, the interpolated route information 30 is created which is expected to be required for route interpolation depending on a road structure and stored in the interpolated route information storage unit 14, allowing easy and rapid route interpolation in the case like the above of links discontinuity occurrence.

The interpolated route information 30 is created for at least an area around a notification point where the driver is notified of the information concerning the fee-charging. The notification point is set in advance on a fee-charging operator side (e.g., road management company, the government, or the like).

The interpolated route information 30 is acquired by the on-board device 1 downloading those created on the fee-charging operator side at a predetermined timing. In this way, the creation of the interpolated route information 30 on the fee-charging operator side allows an interpolated route appropriate in terms of fee-charging to be set, making it possible to create a route interpolating table to which a management principle on the fee-charging operator side is reflected.

For example, in a case where there are, as a link candidate of the interpolated route for connecting a jump source link and a jump destination link, an interpolated route passing through a link that is a toll road and an interpolated route passing through a link that is not a toll road, either interpolated route can be selected by a will on the operator side to create the interpolated route information 30. In this way, according to the embodiment, the interpolated route to which the will on the fee-charging operator side is reflected can be created, such that the interpolated route can be customized on the basis of a free criterion, for example, a distance is prioritized for an interpolated route, a charged fee is prioritized for an interpolated route, or the like.

The interpolated route information 30 may be prepared depending on a type of vehicles or a time zone. For example, there is a road through which a small-size vehicle can pass but a large-size vehicle cannot pass, or a road closed to traffic depending on the time zone. In order to deal with such a case, a part of the interpolated route information 30 may be prepared for each type of vehicles (small-size vehicle, large-size vehicle), or for each time zone. This allows the route interpolation using the interpolated route information 30 appropriate depending on the type of vehicles or time zone.

The interpolated route information 30 also includes the interpolated route in a case of assuming a U-turn or the like. For example, as shown in FIG. 4(a), assuming a road configuration of branching off such as from a link ID 3010 into a link ID 3011 and a link ID 3051. In the road configuration like this, if the jump source link is 3052 and the jump destination link is 3013, it may be assumed that, as shown in FIG. 4(b) by a broken line, a road of the link ID 3052 is travelled part of the way but a U-turn is made to return to the turnoff and a link ID 3011 is entered. Therefore, the interpolated route information 30 is preferably created assuming the case of the link discontinuity by way of the U-turn like this. In this case, the interpolated route information 30 is the information as shown in FIG. 5.

Figure 7:
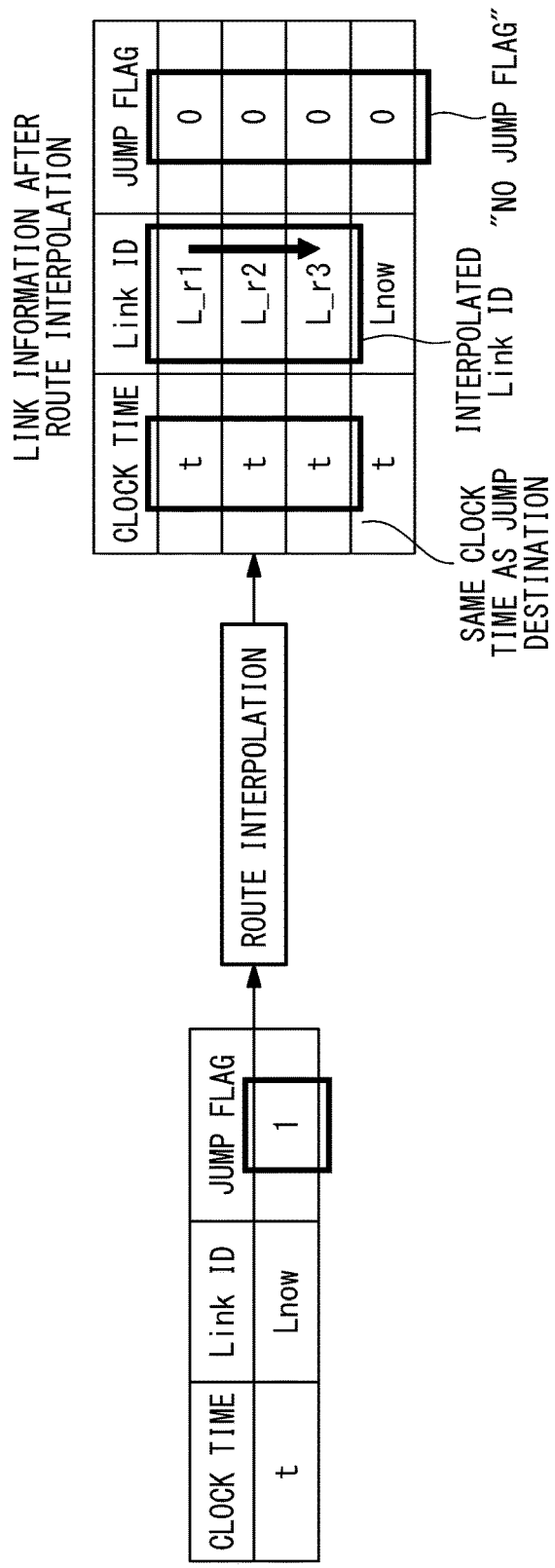
FIG. 7 is a diagram illustrating an example of the link information after interpolating a route.
Figure 10:
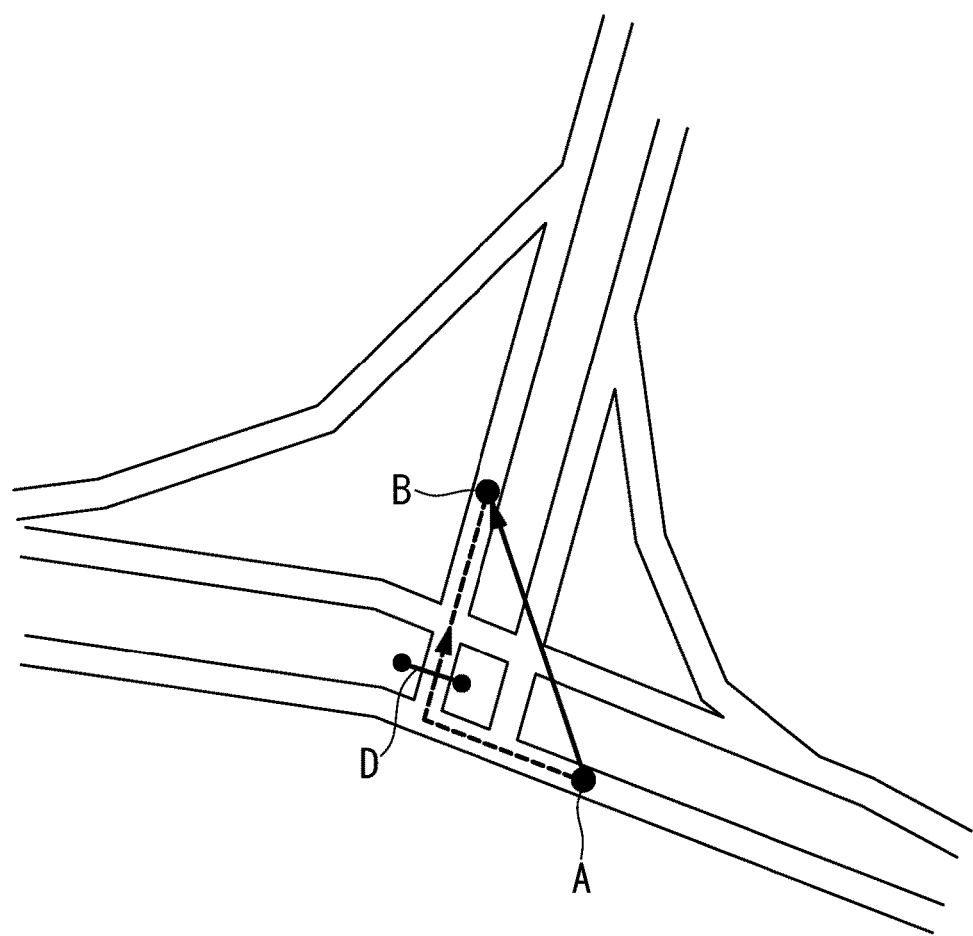
FIG. 10 is an illustration for explaining problems of related art.

In the case where the link IDs consecutively specified by the link specifying unit 13 are continuous, that is, the jump flag of the link information (see FIG. 6) input from the link specifying unit 13 is 0, the moving route creation unit 15 (see FIG. 1) outputs the relevant link information to the fee-charging processing unit 20 described later. On the other hand, in the case where two links consecutively specified are discontinuous on the map information, that is, the jump flag of the link information is 1, the unit 15 uses the interpolated route information 30 stored in the interpolated route information storage unit 14 to interpolate that discontinuous zone and create the link information to which the link ID of the interpolated route is added (route interpolation means). FIG. 7 shows an example of the link information after interpolating the route. As shown in FIG. 7, in the link information after interpolating the route, the clock time of the link information this time is set as the clock time information for the link ID in the interpolated route and the jump flag is changed to 0. The moving route creation unit 15 outputs the link information after the interpolation to the fee-charging processing unit 20.

Further, as for the link information specified by the link specifying unit 13 and the link information having required to be interpolated, the moving route creation unit 15 creates the moving route using the link information after the interpolation. FIG. 8 shows an example of the moving route information. In the link information having the jump flag set to 1, of the moving route information shown in FIG. 8, the information for interpolating the discontinuous zone is not defined in the interpolated route table, indicating that the interpolation was not performed.

Next, a description is given of the fee-charging processing unit 20.

The fee-charging processing unit 20 includes the fee-charging information storage unit (fee-charging information storage means) 21, the determination unit (determination means) 22, the notification unit (notification means) 23, and the fee-charging management unit 24, as shown in FIG. 1.

The fee-charging information storage unit 21 stores therein notified link information (notified line segment information) in which the link ID which is required to be notified relating to the fee-charging, and fee-charging link information in which the link ID of the link in which there is a border between the fee-charging area and an outside of the fee-charging area are registered.

The determination unit 22 determines whether or not the link ID described in the link information input from the moving route creation unit 15 is registered in the notified link information stored in the fee-charging information storage unit 21, and in a case of determining that the link ID is registered, outputs that determination to the notification unit 23.

In addition, the determination unit 22 determines whether or not the link ID described in the link information input from the moving route creation unit 15 is registered in the fee-charging link information stored in the fee-charging information storage unit 21, and in a case of determining that the link ID is registered, outputs that determination to the fee-charging management unit 24.

The notification unit 23, in a case of receiving a notification from the determination unit 22, notifies the driver of the information concerning the fee-charging. For example, the unit 23 notifies of entering the fee-charging area in the case of entering the fee-charging area, and notifies of going out of the fee-charging area in the case of going out of the fee-charging area. The notification may be those appealing to a sense of hearing such as voice, or those appealing to a sense of sight such as a message displayed on an on-board display screen.

When the fee-charging management unit 24 receives the notification from the determination unit 22, the unit 24 starts the fee-charging in a case of existing outside the fee-charging area until this time and ends the fee-charging in a case of existing inside the fee-charging area.

Next, a description is given of an operation of the on-board device 1 configured to include the above described configuration.

First, current positional information of the vehicle is acquired by the positional information acquisition unit 11 by means of the GPS or the like, and this positional information is made to correspond to time information and output to the link specifying unit 13. The link specifying unit 13 specifies the link ID of the link corresponding to the current position by use of the input positional information and the map information stored in the map information storage unit 12. Further, the link specifying unit 13 determines whether or not the specified link is discontinuous with the previously specified link. Then, the unit 13 creates the link information in which a result of the determination, a position acquiring clock time, and the link ID are associated with each other (see FIG. 6), and outputs the created information to the moving route creation unit 15.

The moving route creation unit 15 refers to the jump flag of the link information input from the link specifying unit 13, and, if the jump flag is 0, outputs the link information from the link specifying unit 13 as it is to the fee-charging processing unit 20. In contrast to this, if the jump flag is 1, the unit 13 refers to the interpolated route information 30 stored in the interpolated route information storage unit 14 to interpolate the moving route, and outputs the link information after interpolating the route to the fee-charging processing unit 20.

Further, the moving route creation unit 15 couples the link information (link information after the interpolation is used for the link information having required the route interpolation) with each other in a time series manner to create the moving route information (see FIG. 8).

The link information output from the moving route creation unit 15 is occasionally input to the determination unit 22 in the fee-charging processing unit 20. The determination unit 22 determines whether or not the link ID defined in the link information occasionally input from the moving route creation unit 15 is registered in the notified link information stored in the fee-charging information storage unit 21, and in a case of determining that the link ID is registered, outputs that determination to the notification unit 23.

In addition, the determination unit 22 determines whether or not the link ID defined in the link information occasionally input from the moving route creation unit 15 is registered in the fee-charging link information stored in the fee-charging information storage unit 21, and in a case of determining that the link ID is registered, outputs that determination to the fee-charging management unit 24.

The notification unit 23 notifies the information concerning the fee-charging according to the information input from the determination unit 22. This allows the driver to be timely notified of entering the fee-charging area and going out of the fee-charging area.

Additionally, when the fee-charging management unit 24 receives the notification from the determination unit 22, the unit 24 starts the fee-charging in a case of existing outside the fee-charging area until this time and ends the fee-charging in a case of existing inside the fee-charging area.

As described above, according to the on-board device 1 and the route interpolating method therefor, and the route interpolating program in the embodiment, the interpolated route information 30 interpolating the discontinuous zone between the links is prepared in advance, and if the links consecutively specified by the link specifying unit 13 are discontinuous on the map information, this interpolated route information 30 is used to interpolate the discontinuous zone. Therefore, the discontinuous zone can be interpolated with the interpolated route suitable for the fee-charging by storing in advance the interpolated route suitable for the fee-charging as the interpolated route information 30. This allows a vehicle occupant to be timely notified of the accurate fee-charging information and a disadvantage also to be cancelled that the fee is charged in spite of not entering the fee-charging area.

In addition, the interpolated route information 30 is prepared depending on the time zone or the type of vehicles, allowing to deal with the case of a road closed to traffic depending on the time zone or a road which a vehicle is prohibited from passing through depending on the type of the vehicle.

Further, the interpolated route information 30 is updated at a predetermined time interval, which makes it possible to interpolate the discontinuous zone on the basis of the interpolated route information 30 suitable for an occasional road condition.

Note that in the interpolated route information 30 according to the embodiment, fee-charging cancel information may be added to the individual link IDs constituting the interpolated route.

Figure 4:
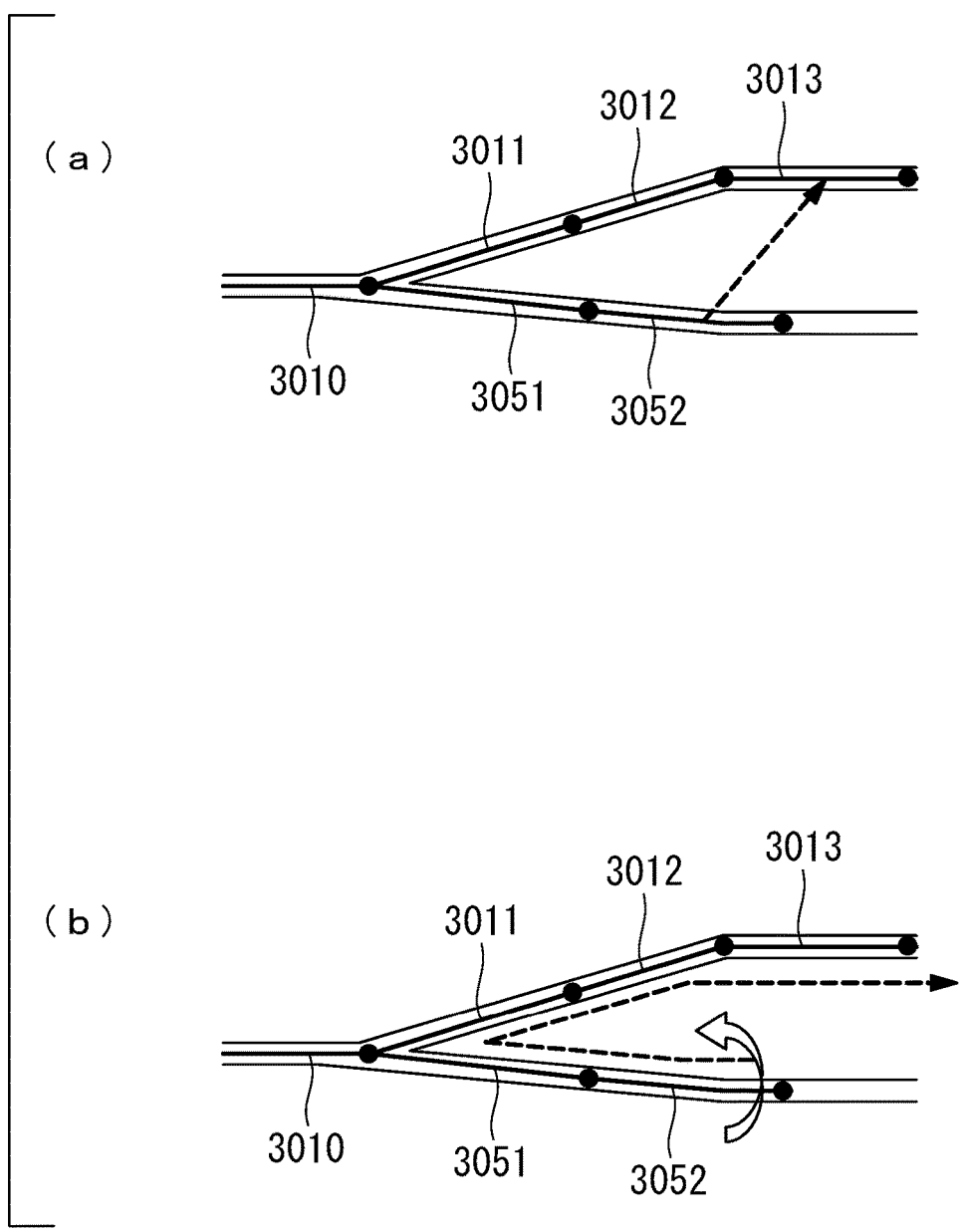
FIG. 4 is an illustration showing an example of an interpolated route in a case of assuming U-turn.

For example, in the road configuration as shown in FIG. 4, assume a case where the link IDs 3051 and 3052 are the links to be fee-charged and stored in the fee-charging link information. In this case, if the link IDs consecutively specified by the link specifying unit 13 are 3052 and 3013, the route interpolation owing to the link discontinuity is performed on the basis of the interpolated route information 30 shown in FIG. 5 and the link information after interpolating the route is link information of passing through the link IDs 3052, 3051, 3011, 3012, and 3013. The determination unit 22 receiving the link information like this, which includes the link IDs 3051 and 3052 to be fee-charged, determines that the fee-charging link information has registered therein the link IDs, and then, the fee-charging management unit 24 starts the fee-charging.

In such a case, there is a case where the fee-charging operator may want to avoid the fee-charging because of turning back in the middle of the toll road which was actually entered.

In order to cancel such a disadvantage, the information for cancelling the fee-charging is added in the interpolated route information 30. For example, as shown in FIG. 9, the fee-charging cancel information is associated so as to correspond to the link IDs 3052 and 3051. The link ID to which the fee-charging cancel information like this is added is not to be determined by the determination unit 22.

This can avoid the fee-charging owing to even the case where the interpolated route includes the link determined to be the toll road.

Note that the present invention is not limited to only the embodiments described above but various modifications may be made such as by combining a part or all of the embodiments described above without departing from the scope of the invention.

REFERENCE SIGNS LIST

1: On-board device
10: Route specifying processing unit
11: Positional information acquisition unit
12: Map information storage unit
13: Link specifying unit
14: Interpolated route information storage unit
15: Moving route creation unit
20: Fee-charging processing unit
21: Fee-charging information storage unit
22: Determination unit
23: Notification unit
24: Fee-charging management unit

The invention claimed is:
1. An on-board device comprising:
a positional information acquisition means acquiring positional information of a mobile object;
a map information storage means storing map information in which a road is divided into a plurality of line segments in a pseudo manner and each of the divided line segments is made to correspond to unique identification information and the positional information;
a line segment specifying means specifying a line segment on the map information corresponding to current positional information of the mobile object;
an interpolated route information storage means storing interpolated route information in which a combination of two discontinuous line segments and a line segment constituting an interpolated route for connecting the former line segments are uniquely defined;
a route interpolation means using the interpolated route information to interpolate a discontinuous zone in a case where two line segments consecutively specified by the line segment specifying means are discontinuous on the map information;
a fee-charging information storage means storing notified line segment information in which the identification information of a line segment which is required to be notified relating to fee-charging is registered;
a determination means determining whether or not the line segments specified by the line segment specifying means and the line segment constituting the interpolated route interpolated by the route interpolation means are registered in the notified line segment information in the fee-charging information storage means; and
a notification means notifying information concerning the fee-charging in a case where the determination means determines the registration.

2. The on-board device according to claim 1, wherein the interpolated route information is updated at a predetermined time interval.

3. The on-board device according to claim 1, wherein the interpolated route information is prepared depending on at least one of a time zone and a type of vehicles, and the route interpolation means uses a interpolated route information satisfying a condition to interpolate the discontinuous line segments.

4. The on-board device according to claim 1, wherein in the interpolated route information, fee-charging cancel information is made addible as attribute information to the line segment constituting the interpolated route.

5. A route interpolating method for an on-board device in which map information in which a road is divided into a plurality of line segments in a pseudo manner and each of the divided line segments is made to correspond to unique identification information and the positional information, and interpolated route information in which a combination of two discontinuous line segments and line segments constituting an interpolated route for connecting the former line segments are uniquely defined are prepared in advance, the method comprising:

a positional information acquisition step of acquiring positional information of a mobile object;

a line segment specifying step of specifying a line segment on the map information corresponding to current positional information of the mobile object;

a route interpolation step of using the interpolated route information to interpolate a discontinuous zone in a case where two line segments consecutively specified in the line segment specifying step are discontinuous on the map information;

a storing step of storing notified line segment information in which the identification information of a line segment which is required to be notified relating to fee-charging is registered;

a determining step of determining whether the line segments specified by the line segment specifying step and the line segment constituting the interpolated route are registered in the notified line segment information; and a notifying step of notifying information concerning the fee-charging in a case where the determination means determines the registration.

6. A route interpolating program for an on-board device in which map information in which a road is divided into a plurality of line segments in a pseudo manner and each of the divided line segments is made to correspond to unique identification information and the positional information, and interpolated route information in which a combination of two discontinuous line segments and line segments constituting an interpolated route for connecting the former line segments are uniquely defined are stored in a storage means in advance, the program causing a computer to execute:

a positional information acquisition process of acquiring positional information of a mobile object;

a line segment specifying process of specifying a line segment on the map information corresponding to current positional information of the mobile object;

a route interpolation process of using the interpolated route information to interpolate a discontinuous zone in a case where two line segments consecutively specified in the line segment specifying process are discontinuous on the map information;

a storing step of storing notified line segment information in which the identification information of a line segment which is required to be notified relating to fee-charging is registered;

a determining step of determining whether the line segments specified by the line segment specifying step and the line segment constituting the interpolated route are registered in the notified line segment information; and a notifying step of notifying information concerning the fee-charging in a case where the determination means determines the registration.

* * * * *